United States Statutory Invention Registration [19]

[11] Reg. Number: H1002

Hahn [43] Published: Dec. 3, 1991

[54] MICROWAVE ABSORBING MATERIAL

[76] Inventor: Harold T. Hahn, 661 Teresi La., Los Altos, Calif. 94024

[21] Appl. No.: 509,670

[22] Filed: Apr. 16, 1990

[51] Int. Cl.[5] ..... B32B 9/00

[52] U.S. Cl. ..... 428/408; 428/402; 428/407; 428/447

[58] Field of Search ..... 428/220, 323, 447; 342/1; 523/137; 219/10.55 D

[56] References Cited

U.S. PATENT DOCUMENTS

| | | | |
|---|---|---|---|
| 2,877,286 | 3/1959 | Vanle et al. | 342/1 X |
| 2,996,710 | 8/1961 | Pratt | 342/1 |
| 3,951,904 | 4/1976 | Tomonaga | 523/137 |
| 4,003,840 | 1/1977 | Ishino et al. | 252/62 |
| 4,112,179 | 9/1978 | Maccalous et al. | 428/325 |
| 4,116,906 | 9/1978 | Ishino et al. | 523/137 |

*Primary Examiner*—Robert L. Stoll
*Assistant Examiner*—Joseph D. Anthony

[57] ABSTRACT

A microwave absorbing material for the range 2500-6000 MHz is formed by using hollow carbon microspheres in the range of sizes between 90 and 350 microns outside diameter mixed unformly in a matrix of flexible silicone such that the microspheres are 27 to 34 percent by weight of the absorbing material. An important advantage of the present invention is the material contains no iron, is shock resistant, flexible and stable in thicknesses of 0.2 inches or greater.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MICROWAVE ABSORBING MATERIAL

FIELD OF THE INVENTION

This invention pertains to a material for absorbing microwave radiation.

BACKGROUND OF THE INVENTION

Microwave absorbing materials are known in the prior art, but these are generally iron-filled and thus dense. Prior art material also tend to be unstable in a high radiation environment.

OBJECTIVES OF THE INVENTION

It is therefore a primary objective of the present invention to provide a stable low-density material for absorbing microwave energy in the 2500 to 6000 MHz band.

SUMMARY OF THE INVENTION

These objects of the invention and other objects, features and advantages to become apparent as the specification progresses are accomplished by the invention according to which, briefly stated, hollow carbon microspheres in the range of sizes between 90 and 350 microns outside diameter are mixed uniformly in a matrix of flexible silicone such that the microspheres are 27 to 34 percent by weight of the absorbing material.

LIST OF ADVANTAGES OF THE INVENTION

The material is strongly absorbent in the range of frequencies 2500 to 6000 MHz.

An important advantage of the present invention is the material is stock resistant, flexible and stable in thickness of 0.2 inches or greater.

For many applications, the most important advantage is its low density compared to iron-loaded composites.

These and further objectives, constructional and operational characteristics, and advantages of the invention will no doubt be more evident to those skilled in the art from the detailed description given hereinafter which illustrates a preferred embodiment by way of non-limiting example.

DESCRIPTION OF THE PREFERRED EMBODIMENTS

Figure 1:
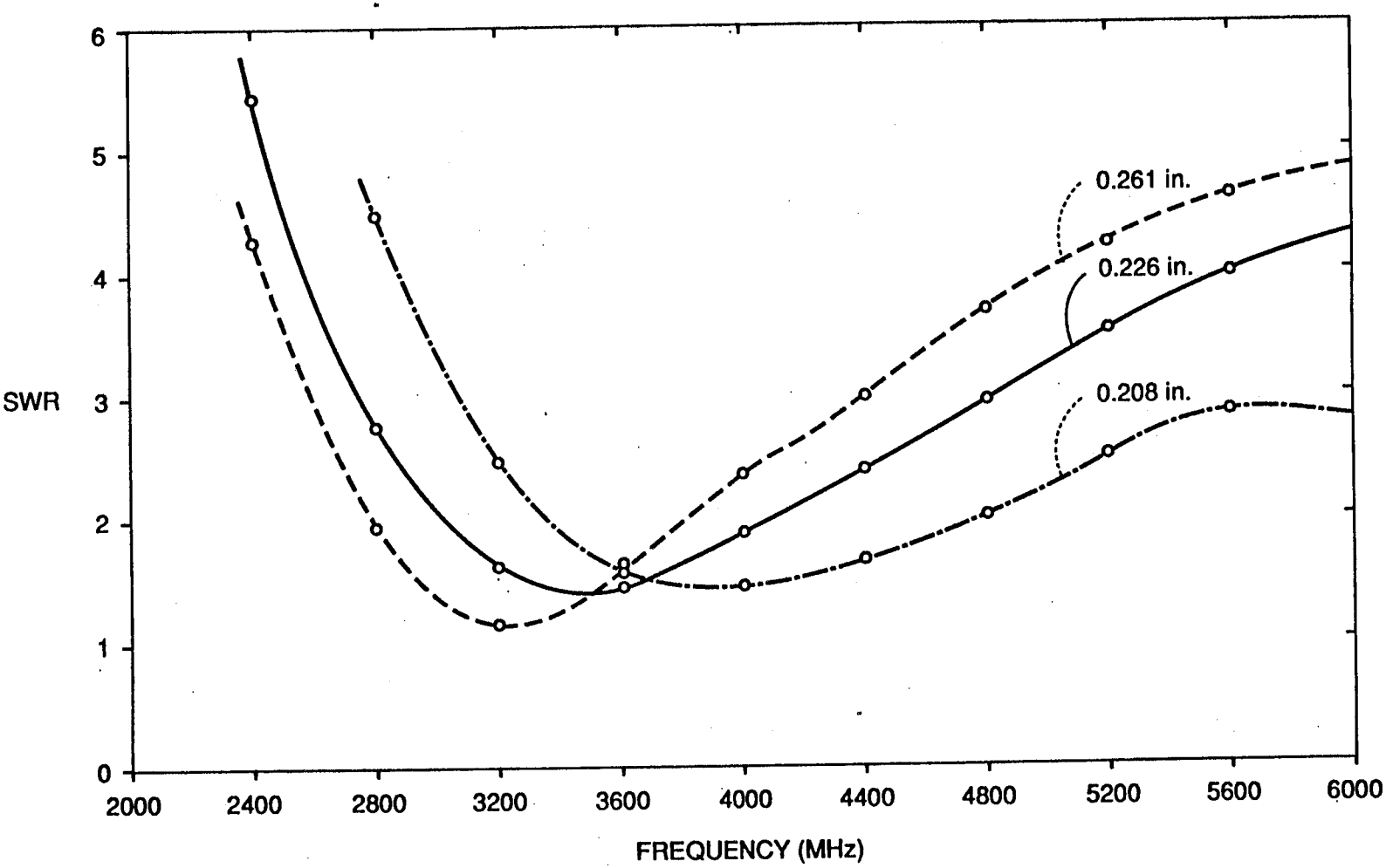
FIG. 1 shows plots of standing wave ratios as a function of frequency for varying thicknesses of the preferred embodiment of the material of the invention.

The material according to the invention is formed by embedding hollow carbon microspheres in a suitable matrix material, such as a flexible silicone or an inflexible epoxy. The carbon microspheres have a preferable diameter between 90 and 350 microns. Carbon microspheres are available from Kureha Chemical Industries Co., Ltd., Tokyo, Japan and Versar, Inc., Springfield, Va. Suitable flexible silicone matrix materials include Dow-Coming RTV 3112, Dow-Coming Sylgard 184, and General Electric Silicone 566A. Sylgard 184 is preferred because it (a) has a good radiation resistance, (b) has low shrinkage during curing, (c) bonds well to a substrate, and (d) needs no post-cure before use. Compositions containing from 27 weight percent microspheres to 34 percent by weight microspheres are best. Although compositions over this range have been tested and found satisfactory, the composition containing 30.0 percent by weight carbon spheres in Sylgard 184 is preferred. This composition has a satisfactory mechanical integrity and flexibility in thicknesses of 0.2 inches and greater.

When backed by a metal plate, i.e., shorted, 0.226 inches thick material of the preferred embodiment displayed the followings standing wave ratios (SWR):

| MHz | SWR |
|---|---|
| 2600 | 3.84 |
| 3000 | 2.03 |
| 3400 | 1.39 |
| 3800 | 1.67 |
| 4200 | 2.18 |
| 4600 | 2.70 |
| 5000 | 3.28 |
| 5400 | 3.82 |
| 6000 | 4.30 |

The density of the preferred embodiment is 0.48 g/cm$^3$. In a thickness of 0.22 inches, this corresponds to 0.55 pounds per square foot.

Another embodiment containing 33.1 percent by weight carbon spheres in RTV 3112 with a thickness of 0.267 inches provided the following standing wave ratios:

| MHz | SWR |
|---|---|
| 2400 | 2.25 |
| 2600 | 1.52 |
| 2800 | 1.31 |
| 3000 | 1.61 |
| 3200 | 2.02 |
| 3400 | 1.98 |
| 3600 | 1.88 |
| 3800 | 1.98 |
| 4000 | 2.10 |
| 5000 | 3.65 |

Another embodiment containing 32.9 percent by weight carbon sphere in Silicone 566A with a thickness of 0.263 inches yielded the following standing wave ratios:

| MHz | SWR |
|---|---|
| 2400 | 2.24 |
| 2600 | 1.61 |
| 2800 | 1.42 |
| 3000 | 1.60 |
| 3200 | 1.90 |
| 3400 | 2.25 |
| 3600 | 2.60 |
| 3800 | 2.93 |
| 4000 | 3.29 |

This invention is not limited to the preferred embodiment and alternatives heretofore described, to which variations and improvements may be made, without departing from the scope of protection of the present patent and true spirit of the invention, the characteristics of which are summarized in the following claims.

What is claimed is:

1. A microwave absorbing material for the range 2500 to 6000 MHz, comprising:

a matrix of flexible silicone, forming 66 to 73 percent by weight of the absorbing material, hollow carbon microspheres having a range of sizes between 90 and 350 microns outside diameter, said microspheres being mixed uniformly into said matrix to form 27 to 34 percent by weight of the absorbing material.

2. The material of claim 1 wherein said matrix material comprises approximately 70 percent by weight of the absorbing material and said hollow carbon microspheres comprise approximately 30 percent by weight of the absorbing material.

3. The material of claim 2 wherein said material is formed into sheets of thickness 0.2 inches or greater.

* * * * *